(12) United States Patent
Kim et al.

(10) Patent No.: US 9,162,212 B2
(45) Date of Patent: Oct. 20, 2015

(54) SUPPORTED CATALYST SYSTEMS AND METHOD OF MAKING BIODIESEL PRODUCTS USING SUCH CATALYSTS

(75) Inventors: Manhoe Kim, Troy, MI (US); Shuli Yan, Detroit, MI (US); Steven O. Salley, Grosse Pointe Park, MI (US); K. Y. Simon Ng, West Bloomfield, MI (US)

(73) Assignee: WAYNE STATE UNIVERSITY, Detroit, MI (US)

( * ) Notice: Subject to any disclaimer, the term of this patent is extended or adjusted under 35 U.S.C. 154(b) by 1053 days.

(21) Appl. No.: 13/255,305

(22) PCT Filed: Mar. 9, 2010

(86) PCT No.: PCT/US2010/026646
§ 371 (c)(1),
(2), (4) Date: Oct. 14, 2011

(87) PCT Pub. No.: WO2010/104844
PCT Pub. Date: Sep. 16, 2010

(65) Prior Publication Data
US 2012/0029218 A1    Feb. 2, 2012

Related U.S. Application Data

(60) Provisional application No. 61/158,560, filed on Mar. 9, 2009.

(51) Int. Cl.
*B01J 23/00*    (2006.01)
*B01J 23/10*    (2006.01)
(Continued)

(52) U.S. Cl.
CPC ............. *B01J 23/002* (2013.01); *B01J 21/06* (2013.01); *B01J 23/02* (2013.01); *B01J 23/10* (2013.01);
(Continued)

(58) Field of Classification Search
CPC .......... B01J 23/002; B01J 23/02; B01J 23/10; B01J 21/06; B01J 29/405; B01J 37/0009; B01J 37/0201; B01J 37/031; B01J 37/08; B01J 2523/00; C10L 1/026; C11C 3/10; Y02E 50/13
USPC ..................... 44/605; 502/302, 303, 304, 340
See application file for complete search history.

(56) References Cited

U.S. PATENT DOCUMENTS 5,164,497  A  * 11/1992  King et al. ................ 544/87
2005/0274065 A1 * 12/2005 Portnoff et al. ............. 44/605
2010/0077655 A1    4/2010 Bauldreay et al.

OTHER PUBLICATIONS

Albuquerque, Mônica C.G. et al.: "CaO supported on mesoporous silicas as basic catalysts for transesterification reactions" Applied Catalysis A: General, vol. 334, Nos. 1-2 (2008), pp. 35-43 (ISSN: 0926-860X).

(Continued)

*Primary Examiner* — James Goloboy
*Assistant Examiner* — Latosha Hines
(74) *Attorney, Agent, or Firm* — Brinks Gilson & Lione (57) ABSTRACT

A heterogeneous catalyst system, a method of preparing the catalyst system and a method of forming a biodiesel product via transesterification reactions using the catalyst system is disclosed. The catalyst system according to one aspect of the present disclosure represents a class of supported mixed metal oxides that include at least calcium oxide and another metal oxide deposited on a lanthanum oxide or cerium oxide support. Preferably, the catalysts include CaO—$CeO_2ZLa_2O_3$ or CaO—$La_2O_3/CeO_2$. Optionally, the catalyst may further include additional metal oxides, such as CaO—$La_2O_3$—$GdOxZLa_2O_3$.

9 Claims, 4 Drawing Sheets (51) Int. Cl.
| | |
|---|---|
| B01J 21/06 | (2006.01) |
| B01J 23/02 | (2006.01) |
| B01J 29/40 | (2006.01) |
| B01J 37/00 | (2006.01) |
| B01J 37/02 | (2006.01) |
| B01J 37/03 | (2006.01) |
| B01J 37/08 | (2006.01) |
| C10L 1/02 | (2006.01) |
| C11C 3/10 | (2006.01) |

(52) U.S. Cl.
CPC ............ *B01J 29/405* (2013.01); *B01J 37/0009* (2013.01); *B01J 37/0201* (2013.01); *B01J 37/031* (2013.01); *B01J 37/08* (2013.01); *C10L 1/026* (2013.01); *C11C 3/10* (2013.01); *B01J 2523/00* (2013.01); *Y02E 50/13* (2013.01)

(56) References Cited

OTHER PUBLICATIONS

Albuquerque, Mônica C.G. et al.: "MgM (M=Al and Ca) oxides as basic catalysts in transesterification processes" Applied Catalysis A: General, vol. 347 (2008), pp. 162-168 (ISSN: 0926-860X).

Alonso, Martín D. et al.: "Potassium leaching during triglyceride transesterification using K/γ-Al$_2$O$_3$ catalysts" Catalysis Communications, vol. 8, No. 12 (2007), pp. 2074-2080 (ISSN: 1566-7367).

Bournay, L. et al.: "New heterogeneous process for biodiesel production: A way to improve the quality and the value of the crude glycerin produced by biodiesel plants" Catalysis Today, vol. 106, Nos. 1-4 (2005), pp. 190-192 (ISSN: 0920-5861).

Corma, A. et al.: "Catalysts for the Production of Fine Chemicals—Production of Food Emulsifiers, Monoglycerides, by Glycerolysis of Fats with Solid Base Catalysts" Journal of Catalysts, vol. 173, No. 2 (1998), pp. 315-321 (ISSN: 0021-9517).

Di Serio, M. et al.: "Transesterification of Soybean Oil to Biodiesel by Using Heterogeneous Basic Catalysts" Industrial & Engineering Chemistry Research, vol. 45, No. 9 (2006), pp. 3009-3014 (ISSN: 0888-5885).

Duo, Wenli et al.: "Crystallization and fracture: formation of product layers in sulfation of calcined limestone" Powder Technology, vol. 111, Nos. 1-2 (2000), pp. 154-167 (ISSN: 0032-5910).

Grandos, M. López et al: "Biodiesel from sunflower oil by using activated calcium oxide" Applied Catalysis B: Environmental, vol. 73, Nos. 3-4 (2007), pp. 317-326 (ISSN: 0926-3373).

Gryglewicz, Stanislaw: "Rapeseed oil methyl esters preparation using heterogeneous catalysts" Bioresource Technology, vol. 70, No. 3 (1999), pp. 249-253 (ISSN: 1873-2976).

Kawashima, Ayato et al.: "Development of heterogeneous base catalysts for biodiesel production" Bioresource Technology, vol. 99 (2008), pp. 3439-3443 (ISSN: 1873-2976).

Kim, Hak-Joo et al.: "Transesterification of vegetable oil to biodiesel using heterogeneous base catalyst" Catalysis Today, vol. 93-95 (2004), pp. 315-320 (ISSN: 0920-5861).

Kim, M. et al.: "Transesterification of Glycerides Using a Heterogeneous Resin Catalyst Combined with a Homogeneous Catalyst" Energy & Fuels, vol. 22, No. 6 (2008), pp. 3594-3599 (ISSN: 0887-0624).

Kouzu, Masato et al.: "Active phase of calcium oxide used as solid base catalyst for transesterification of soybean oil with refluxing methanol" Applied Catalysis A: General, vol. 334, Nos. 1-2 (2008), pp. 357-365 (ISSN: 0926-860X).

Kouzu, Masato et al.: "Calcium oxide as a solid base catalyst for transesterification of soybean oil and its application to biodiesel production" Fuel, vol. 87, No. 12 (2008), pp. 2798-2806 (ISSN: 0016-2361).

Li, Haitao et al.: "Transesterification of soybean oil to biodiesel with Zn/I$_2$ catalyst" Catalysis Letters, vol. 107, Nos. 1-2 (2006), pp. 25-30 (ISSN: 1011-372X).

Liu, Xuejun et al.: "Calcium Ethoxide as a Solid Base Catalyst for the Transesterification of Soybean Oil to Biodiesel" Energy & Fuels, vol. 22, No. 2 (2008), pp. 1313-1317 (ISSN: 0887-0624).

Liu, Xuejun et al.: "Calcium methoxide as a solid base catalyst for the transesterification of soybean oil to biodiesel with methanol" Fuel, vol. 87, No. 7 (2008), pp. 1076-1082 (ISSN: 0016-2361).

Liu, Xuejun et al.: "Transesterification of soybean oil to biodiesel using CaO as a solid base catalyst" Fuel, vol. 87, No. 2 (2008), pp. 216-221 (ISSN: 0016-2361).

Macado, Caio C.S. et al.: "New Heterogeneous Metal-Oxides Based Catalyst for Vegetable Oil Trans-esterification" Journal of the Brazilian Chemical Society, vol. 17, No. 7 (2006), pp. 1291-1296, Brasília, Brazil (ISSN: 0103-5053).

Martyanov, Igor N. et al.: "Comparative study of triglyceride transesterification in the presence of catalytic amounts of sodium, magnesium, and calcium methoxides" Applied Catalysis A: General, vol. 339, No. 1 (2008), pp. 45-52 (ISSN: 0926-860X).

Ngamcharussrivichai, Chawalit et al.: "Ca and Zn mixed oxide as a heterogeneous base catalyst for transesterification of palm kernel oil" Applied Catalysis A: General, vol. 341, Nos. 1-2 (Jun. 2008), pp. 77-85 (ISSN: 0926-860X).

Ramos, María Jesús et al.: "Transesterification of sunflower oil over zeolites using different metal loading: A case of leaching and agglomeration studies" Applied Catalysis A: General, vol. 346, Nos. 1-2 (2008), pp. 79-85 (ISSN: 0926-860X).

Suppes, Galen J. et al.: "Transesterification of soybean oil with zeolite and metal catalysts" Applied Catalysis A: General, vol. 257, No. 2 (2004), pp. 213-223 (ISSN: 0926-860X).

Watkins, Robert S. et al.: "Li—CaO catalysed tri-glyceride transesterification for biodiesel Applications" Green Chemistry, vol. 6, No. 7 (2004), pp. 335-340 (ISSN: 1463-9262).

Xie, Wenlei et al.: "Calcined Mg—Al hydrotalcites as solid base catalysts for methanolysis of soybean oil" Journal of Molecular Catalysis A: Chemical, vol. 246, Nos. 1-2 (2006), pp. 24-32 (ISSN: 1381-1169).

Xie, Wenlei et al.: "Synthesis of biodiesel from soybean oil using heterogeneous KF/ZnO catalyst" Catalysis Letters, vol. 107, Nos. 1-2 (Feb. 2006), pp. 53-59 (ISSN: 1011-372X).

Xie, Wenlei et al.: "Transesterification of soybean oil catalyzed by potassium loaded on alumina as a solid-base catalyst" Applied Catalysis A: General, vol. 300, No. 1 (2006), pp. 67-74 (ISSN: 0926-860X).

Yan, Shuli et al.: "Simultaneous transesterification and esterification of unrefined or waste oils over ZnO—La$_2$O$_3$ catalysts" Applied Catalysis A: General, vol. 353, No. 2 (2009), pp. 203-212 (ISSN: 0926-860X).

\* cited by examiner

SUPPORTED CATALYST SYSTEMS AND METHOD OF MAKING BIODIESEL PRODUCTS USING SUCH CATALYSTS

FEDERALLY SPONSORED RESEARCH AND DEVELOPMENT

This invention was made with government support under Contract Nos. 337842 and 446920 awarded by the U.S. Department of Energy. The U.S. government may retain certain rights to the invention.

CROSS REFERENCE TO RELATED APPLICATIONS

The present application claims the benefit of priority to PCT Application No. PCT/US2010/026646, filed Mar. 9, 2010, which application claims the benefit of U.S. Provisional Patent Application No. 61/158,560, filed Mar. 9, 2009, the entirety of which is hereby incorporated by reference.

FIELD

This invention relates generally to biodiesel products. More specifically, this invention pertains to heterogeneous catalysts, a means of forming these catalysts, and a method used to form biodiesel products using such catalysts.

BACKGROUND

Biodiesel is a processed fuel that has similar combustion properties to fossil diesel. Biodiesel is derived from the esterification and transesterification of free fatty acids (FFAs) and triglycerides, respectively, which occur naturally in renewable biological sources such as plants oils and animal fats. Since biodiesel can significantly decrease the emission of $CO_2$, $SO_x$, and unburned hydrocarbons from the exhaust of motor vehicles, it is environmentally beneficial, and therefore, a promising alternative to fossil diesel.

The conventional process used for biodiesel production converts triglycerides to alkylesters by transesterification with alcohols in the presence of homogeneous base catalysts as depicted in Equation 1. Even though homogeneous catalyzed biodiesel processes are relatively fast and show high conversion rates, the separation of the homogeneous catalyst from the reaction products can be problematic. Primarily, the aqueous quenching of the reaction may result in the formation of stable emulsions and the saponification of the homogenous catalysts, making the separation of methyl-esters (biodiesel) and glycerol products difficult and costly; requiring the use of a large amount of excess water. Moreover, the use of homogeneous catalysts (strong acids or bases) can lead to many engineering problems, such as equipment corrosion, as well as some environmental problems, such as the disposal of the waste catalysts and contaminated wash water.

Currently, most of the commercial biodiesel produced in the U.S. comes from the transesterification of food grade vegetable oils with methanol using alkaline (KOH, $NaOCH_3$) as catalysts. With this conventional homogeneous method, free fatty acid (FFA) content in oils must be lower than 0.5% and water content lower than 0.06%. Thus, high cost of food grade vegetable oils leads to high production cost of biodiesel.

In order to minimize problems associated with homogeneous catalytic processes, the development of efficient heterogeneous catalyst systems for use in the formation of biodiesel products would be beneficial. The use of a heterogeneous catalyst system could offer multiple advantages over conventional homogeneous catalyst systems. First, heterogeneous catalysts would be more easily recovered from the reaction mixture and recyclable. Second, heterogeneous catalysts, which are typically non-corrosive, would be more environmentally benign.

Although several types of heterogeneous catalyst systems have been evaluated for use in biodiesel production, each of these catalyst systems exhibits various disadvantages or inefficiencies that need to be overcome. For example, although some alkali metal or alkali earth-containing catalysts show high initial activities, these alkali metal ions are easily dissolved in the reaction media. Furthermore, a spinel mixed oxide of Zn and Al, which is commercially available from the French Institute of Petroleum, requires both a high temperature and a high pressure condition when used as a heterogeneous catalyst for biodiesel production due to a relatively low level of catalytic activity. In order for a heterogeneous catalyst to be effectively used for the formation of biodiesel products, it is desirable that the occurrence of the small surface area associated with the catalyst that is caused by sintering at high temperatures and the dissolution of the catalyst into the reaction media be addressed.

The heterogeneous catalyst system of the present disclosure addresses the issues related to homogeneous catalysts and conventional heterogeneous catalyst systems. The heterogeneous catalyst system of the present disclosure utilizes the influences exerted by basic supports ($CeO_2$ or $La_2O_3$) to enhance the catalytic behavior of supported metal oxide catalysts (e.g., oxides of Ce, La, Ca, Nd, Pr, Er, Gd, and Yb). Mixed metal oxides of Ce, La, Ca, Nd, Pr, Er, Gd, and Yb may be supported on basic supports of $CeO_2$ or $La_2O_3$ in the preparation of heterogeneous catalyst systems for the transesterification of soybean oil with methanol in both batch and continuous flow reactors.

SUMMARY

The present invention provides a method of forming a biodiesel product via transesterification. The method includes preparing a supported catalyst system that comprises a mixture of metal oxides on a basic support. An oil feedstock and an alcohol are then placed in contact with the catalyst system to form a reaction mixture. The reaction is allowed to proceed for a predetermined amount of time to form fatty acid methyl esters (FAME) and result in a biodiesel product. Finally, the catalyst is separated from the biodiesel product in order to collect the biodiesel product.

According to another aspect of the present invention, a novel supported catalyst system used for the production of a biodiesel product from unrefined or waste oils is described. The supported catalyst system comprises mixed metal oxides of Ce, La, Ca, Nd, Pr, Er, Gd, and Yb deposited on basic supports, such as lanthanum oxide or cerium oxide via an impregnation method or sol-gel process. The catalytic activities of the supported mixed metal oxide catalysts are highly dependent on the basic nature of the supports. The basicity of the supported mixed metal oxide (Ce, La, Ca, Nd, Pr, Er, Gd, and Yb) catalysts can be elevated on the basic supports ($La_2O_3$, $CeO_2$). In addition, the leaching of calcium species into the reaction media is minimized by using the mixed metal oxide catalysts deposited on a basic support, such as $CeO_2$ or $La_2O_3$. In addition, the mixed metal oxide catalysts can be pelletized into mechanically strong particles (e.g., pelletized form), which can be used as bedded catalysts in a continuous flow reactor for a long reaction period.

According to another aspect of the present disclosure, the supported catalyst systems may optionally include a number of metal oxides in excess of two (i.e., combinations of Ce, La, Ca, Nd, Pr, Er, Gd, and Yb in addition to $CaO$—$CeO_2$ or $CaO$—$La_2O_3$). For example, $CaO$—$NdOx$-$La_2O_3$, $CaO$—$NdOx$-$La_2O_3$—$CeO_2$, $CaO$—$YbOx$-$La_2O_3$—$CeO_2$, $CaO$—$ErOx$-$La_2O_3$—$NdOx$, $CaO$—$CeO_2$—$La_2O_3$—$PrOx$, $CaO$—$GdOx$-$La_2O_3$, to name a few, may be used in combination with a support material.

Another objective of the present disclosure is to provide a method of preparing supported catalysts for use in the production of biodiesel. The method used to prepare the supported catalysts involves the deposition of mixed metal salts of Ce, La, Ca, Nd, Pr, Er, Gd, or Yb onto the support material via either impregnation or a sol-gel process followed by calcination. The method of preparing such catalysts may also optionally include the pelletizing of the solid catalyst.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. It should be understood that throughout the description and drawings, corresponding reference numerals indicate like or corresponding parts and features.

The present invention generally provides a heterogeneous catalyst system for use in the preparation of biodiesel products via transesterification of an oil feedstock in the presence of an alcohol. The catalyst system according to one embodiment of the present disclosure represents a mixture of metal oxide (Ce, La, Ca, Nd, Pr, Er, Gd, and Yb) species deposited on a metal oxide support that exhibits high catalytic activity for oil transesterification. The use of this novel supported catalyst system may significantly reduce the cost of producing biodiesel due to catalytic activity and stability during transesterification reactions.

According to one aspect of the present disclosure the catalytic activity of supported catalyst system during the transesterification of soybean oil exhibits a substantial correlation with its corresponding basic strength. The catalytic activity of the supported catalyst system is dependent upon the basic strength of the calcium oxide and any other metal oxides used in combination therewith, the stability of the catalytic species, the surface area associated with the catalytic species, and the presence of basic support materials, such as lanthanum oxide and/or cerium oxide. In order to maximize stability and minimize calcium leaching, the supported catalyst system preferably uses a combination of at least two mixed metal oxides, such as $CaO$—$CeO_2$ or $CaO$—$La_2O_3$, as the catalyst incorporated onto or into a lanthanum oxide or cerium oxide support.

The metal compositions exhibited by $CaO$—$La_2O_3$ and $CaO$—$CeO_2$ catalysts deposited on various metal oxide supports as measured using SEM-EDS are provided in Runs 1-7 shown in Table 1. The atomic percents of calcium (Ca) and lanthanum (La) in the supported catalysts in Runs 1-7 range between about 6.4 to about 8.6% and about 1.9 to about 5.0%, respectively. Even though the same or similar amount of each metal oxide was applied to the supports, the metal compositions measured for each catalyst deposited on the support were found not to be identical. Although not wanting to be bound by theory, the measured compositional differences are believed to be due to the presence of different particle sizes (i.e., particles range in size from about 40 nanometers to about 3.0 μm) associated with the catalysts, the morphology associated with the supports, and the characteristic range of depth associated with the solid catalysts emitting spectrum.

Among the alkali and alkali earth oxides, calcium oxide (CaO) is known to possess both high base strength and low solubility in methanol. Several types of catalysts that incorporate calcium either as CaO, calcium carbonate, calcium methoxide, calcium ethoxide, magnesium calcium oxide, calcium zinc oxide, $CaZrO_3$, CaO—$CeO_2$, or calcium supported on mesoporous silica have been evaluated for use in biodiesel production. For example, Kawashima et al. reported in an article published in *Bioresource Technology* 99 (2008), pages 3439-3443 described the preparation of two-component $CaZrO_3$ and CaO—$CeO_2$ catalysts using conventional solid state reaction for potential use in biodiesel production. This solid state reaction involves mixing the metal oxides in desired proportions followed by calcination.

TABLE 1

| | | Atomic Percent (%) | | |
|---|---|---|---|---|
| Run # | Catalysts | Ca | La | Ce |
| 1 | CaO—$La_2O_3$/γ-$Al_2O_3$ | 6.4 | 2.4 | |
| 2 | CaO—$La_2O_3$/$TiO_2$ | 6.8 | 2.7 | |
| 3 | CaO—$La_2O_3$/$ZrO_2$ | 7.6 | 3.3 | |
| 4 | CaO—$La_2O_3$/$CeO_2$ | 8.6 | 5.0 | |
| 5 | CaO—$CeO_2$/$La_2O_3$ | 8.6 | 86.6 | 4.8 |
| 6 | CaO—$La_2O_3$/$La_2O_3$ | 8.6 | 91.4 | |
| 7 | CaO—$La_2O_3$/ZSM-5 | 6.9 | 1.9 | |

The supported catalyst systems of the present disclosure differ substantially from conventional heterogeneous catalysts in their composition, materials, and methods used in their synthesis or formation. The supported catalysts of the present disclosure are prepared according to either an impregnation method or sol-gel method where metal salts solutions, i.e., $Ce(NO_3)_4 \cdot 6H_2O$, $Ca(NO_3)_2 \cdot 4H_2O$, and $La(NO_3)_3 \cdot 6H_2O$, are added to pure solid supports (cerium oxide, lanthanum oxide) and then aged, dried, and calcined. The resulting supported catalysts incorporate three metal combinations (for example, CaO—$CeO_2$/$La_2O_3$, CaO—$La_2O_3$/$La_2O_3$, CaO—$La_2O_3$/$CeO_2$, CaO—$CeO_2$/$CeO_2$) that may also be described as a combination of at least two metal oxide catalysts (e.g., CaO—$CeO_2$ or CaO—$La_2O_3$) deposited on a metal oxide support (e.g., /$La_2O_3$ or /$CeO_2$).

The use of lanthanum oxide and cerium oxide supports is preferred because they offer basic properties that provide a synergistic effect to the basic properties exhibited by the metal oxide catalyst in transesterification reactions used in the production of biodiesel. In order to reduce calcium leaching from the solid surface, the calcium oxide is combined with an additional metal oxide, such as lanthanum oxide or cerium oxide, thereby, establishing the three component catalyst system described above. These catalyst compositions exhibit both high catalytic activity and high durability in the reaction medium.

The basicity associated with the supported catalyst was found to be strongly related to properties of the supports utilized as shown in Table 2. In Table 2, the pH values measured for methanol solutions in contact with various metal oxide supports and CaO—$La_2O_3$ metal oxides supported on these metal oxide supports is provided. According to the measured pH values, the ZSM-5 (Run 8) and titanium oxide (Run 9) supports are classified as being acidic in nature, i.e., pH below 6.0; the cerium oxide (Run 10) and lanthanum oxide (Run 11) supports as being basic in nature, i.e., pH above 8.0; and the zirconium oxide (Run 12) and γ-alumina (Run 13) supports being relative neutral in nature, i.e., pH between about 6 to 8. When the CaO—$La_2O_3$ catalyst was loaded onto the supports, the pH values were observed to increase in all cases, except when CaO—$La_2O_3$ is supported on titanium dioxide (written as CaO—$La_2O_3$/$TiO_2$).

TABLE 2

| Run # | Supports | pH | with Catalysts | pH |
|---|---|---|---|---|
| 8 | ZSM-5 | 3.0 | CaO—$La_2O_3$/ZSM-5 | 6.5 |
| 9 | $TiO_2$ | 3.0 | CaO—$La_2O_3$/$TiO_2$ | 3.0 |
| 10 | $ZrO_2$ | 8.0 | CaO—$La_2O_3$/$ZrO_2$ | 11.5 |
| 11 | $Al_2O_3$ | 8.0 | CaO—$La_2O_3$/γ-$Al_2O_3$ | 11.0 |
| 12 | $CeO_2$ | 9.0 | CaO—$La_2O_3$/$CeO_2$ | >12.0 |
| 13 | $La_2O_3$ | 10.2 | CaO—$La_2O_3$/$La_2O_3$ | >12.0 |

(0.1 g support or support with catalyst per 2 mL methanol)

Figure 1:
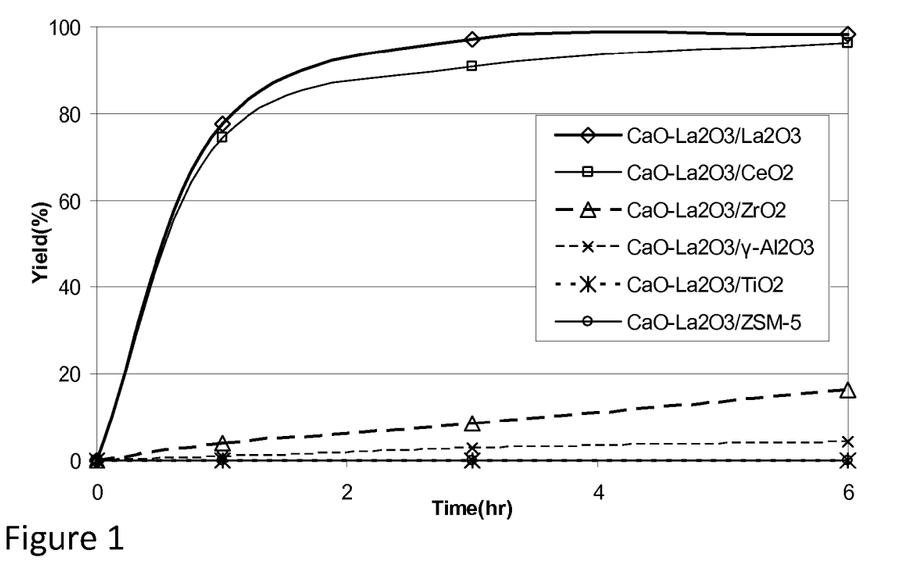
FIG. 1 is a graphical representation of the yield of fatty acid methyl esters (FAME) from transesterification reactions using $CaO$—$La_2O_3$ deposited on various supports plotted as a function of time.

Referring now to FIG. 1, when the supported CaO—$La_2O_3$ catalysts are used in the transesterification of soybean oil with methanol, the catalytic activity of the supported CaO—$La_2O_3$ catalysts is found to be highly dependent on the nature of the supports. The highest catalytic activity (77.7% of yield after 1 hour) was observed when using the CaO—$La_2O_3$/$La_2O_3$ catalyst. This highest activity can be attributed to the elevating or synergistic effect of the basic support $La_2O_3$. In addition, the catalytic activities associated with the various supported catalysts were found to coincide with the order in measured pH values (CaO—$La_2O_3$/$La_2O_3$≥CaO—$La_2O_3$/$CeO_2$>CaO—$La_2O_3$/$ZrO_2$>CaO—$La_2O_3$/γ-$Al_2O_3$>CaO—$La_2O_3$/ZSM-5>CaO—$La_2O_3$/$TiO_2$). However, no biodiesel was formed with the acidic CaO—$La_2O_3$/ZSM-5 and CaO—$La_2O_3$/$TiO_2$ catalyst systems, even though the loading of CaO—$La_2O_3$ was 8.8 and 9.5%, respectively. Although not wanting to be bound by theory, this result is believed to indicate that the basic sites of CaO—$La_2O_3$ are neutralized on the acidic support and become ineffective for catalyzing the transesterification reaction.

The stability of CaO on various supports was determined by measuring with ICP spectroscopy the amounts of [$Ca^{2+}$] ion dissolved into the reaction product (i.e., fatty acid methyl esters, FAME) from the support's surface as shown in Table 3. The amount of dissolved [$Ca^{2+}$] and [$La^{3+}$] ions in the oil phase were found to correlate with the strength of base catalysts. In other words, as the yield of the reaction products derived from the catalyzed reaction increased, the amount of dissolved [$Ca^{2+}$] and [$La^{3+}$] ions in the oil phase was observed to increase. It is believed that low metal concentrations in the FAME reaction products arising from the use of the CaO—$La_2O_3$/ZSM-5 (Run 14) and CaO—$La_2O_3$/$TiO_2$ (Run 15) catalysts is due to the strong interaction between the CaO and $La_2O_3$ with the ZSM-5 and $TiO_2$ supports. In other words, the low concentration of dissolved [$Ca^{2+}$] and [$La^{3+}$] ions is believed to be due to the strong interactions between the basic CaO—$La_2O_3$ catalyst and the acidic supports. Conversely, catalysts supported using basic supports, such as $CeO_2$ (Run 18) and $La_2O_3$ (Run 19) gave higher initial dissolved [$Ca^{2+}$] and [$La^{3+}$] concentrations in the reaction products as a result of a weaker interaction between the basic CaO—$La_2O_3$ catalyst and the basic supports.

Figure 2:
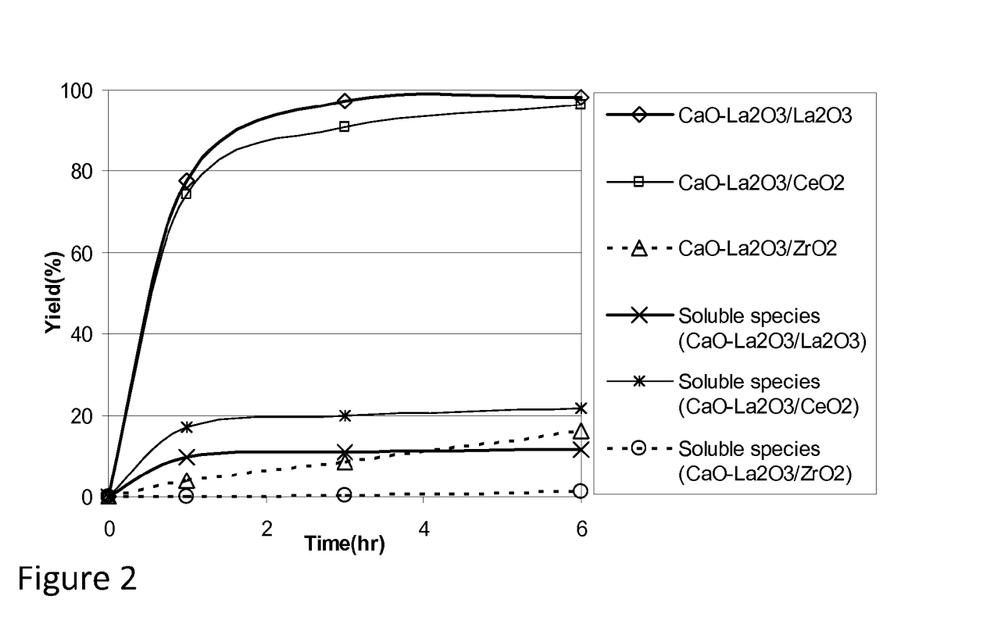
FIG. 2 is a graphical representation of the yield of fatty acid methyl esters (FAME) from transesterification reactions using both the dissolved species and solid catalyst generated by contacting methanol and a $CaO$—$La_2O_3$ catalyst as deposited on various supports and activated at 750° C. plotted as a function of time.

Although the dissolution of the CaO into the reaction media or the leaching of active species from the surface of the supported catalyst systems into the reaction products is less than obtained using homogenous catalysts, the presence of leached species is believed to contribute to the resulting reaction product (i.e., FAME) yields. In order to determine how much of the FAME yield can be contributed to the occurrence of leaching, the yield of FAME obtained due to leaching of homogeneous catalysts (CaO) created by contacting methanol (4.55 mL) and 0.8 g of solid catalysts activated at 750° C. was measured. The FAME yields attributed to leached species from both the homogeneous and heterogeneous, supported catalysts can then be compared as shown in FIG. 2.

TABLE 3

| Run # | Catalyst | Yield (%) at 3 hrs | Concentration in product (oil) phase | |
|---|---|---|---|---|
| | | | $[Ca^{2+}]$ ppm | $[La^{3+}]$ ppm |
| 14 | $6CaO—La_2O_3/TiO_2$ | 0.2 | 5.5 | 0.9 |
| 15 | $6CaO—La_2O_3/ZSM$-5 | 0.2 | 6.4 | 1.2 |
| 16 | $6CaO—La_2O_3/\gamma\text{-}Al_2O_3$ | 2.8 | 5.7 | 1.0 |
| 17 | $6CaO—La_2O_3/ZrO_2$ | 8.7 | 55 | 1.9 |
| 18 | $6CaO—La_2O_3/CeO_2$ | 91.0 | 134 | 2.3 |
| 19 | $6CaO—La_2O_3/La_2O_3$ | 97.2 | 238 | 75 |

Reaction conditions: soybean oil 10.0 g, methanol: oil mole ratio = 10:1, catalyst 0.8 g, reaction temperature 64° C., and shaking speed 450 rpm.

Referring to FIG. 2, the yields of 97.2% and 10.9% after 3 hours were obtained with the $CaO—La_2O_3/La_2O_3$ supported catalyst and the soluble species derived from the $CaO—La_2O_3/La_2O_3$, respectively. About 11% of the measured yield resulted from the contribution of the homogeneous catalyst. Compared to this, the yields of 91% and 20% after 3 hours with the $CaO—La_2O_3/CeO_2$ supported catalyst and the soluble species derived from the $CaO—La_2O_3/CeO_2$ were obtained, respectively. The leached species derived from the $CaO—La_2O_3/CeO_2$ supported catalyst contributed more to the FAME yield than the soluble species derived from the $CaO—La_2O_3/La_2O_3$. Thus it is believed that the heterogeneous $CaO—La_2O_3$ catalyst sites are more strongly stabilized on the $La_2O_3$ support than on the $CeO_2$ support. A negligible yield (0.2%) was obtained with the leached phase derived from the $CaO—La_2O_3/ZrO_2$ supported catalyst. The leaching of CaO is negligible with acidic or neutral supports and coincides with the calcium concentrations described in Table 3.

Figure 3:
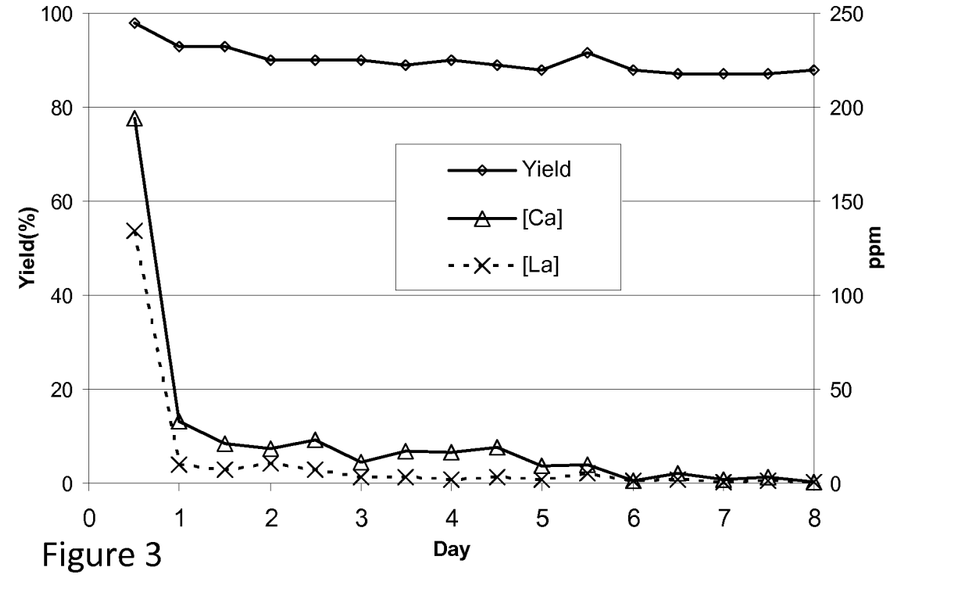
FIG. 3 is a graphical representation of (a) the yield measured for fatty acid methyl esters (FAME) formed from transesterification reactions in a continuous flow reactor; and (b) the amount of calcium and lanthanum measured in the FAME reaction product plotted as a function of time.

Referring now to FIG. 3, the catalytic activity of the supported $CaO—CeO_2/La_2O_3$ system of the present disclosure towards the formation of fatty acid methyl esters (FAME) via a transesterification reaction was observed to be sustainable over a long reaction period (at least 8 days). The catalytic activity and dissolution of calcium from the supported catalyst system during this long reaction period was measured every 12 hours. The transesterification reaction was performed in a continuous flow reactor under reaction conditions that included a tube reactor having a diameter of 12.7 mm, a reactor length of 60 cm, a retention time of 73 min, a feed ratio of methanol:oil equal to 15:1, a feed rate of 0.5 mL/minute, a reaction temperature of 80° C., and a reactor pressure of 14.0 atm. The FAME product was formed during the first 12 hours at a rate that established a 98% yield. This yield level was observed to decrease to about 88 to 90%, which was then maintained during the following 8 days. Over this same time period the calcium concentration in the FAME product was observed to diminish from 194 ppm as measured in the initial collected product to a level that was below 5.0 ppm. This decrease in the amount of calcium being leached into the reaction product indicates that the FAME yield of about 88 to 90% is mainly due to the supported $CaO—CeO_2/La_2O_3$ catalyst.

Although the total amount of calcium and lanthanum deposited as $CaO—La_2O_3$ on a $CeO_2$ support was in the range of about 13.6 to 17.4%, the transesterification activity of the supported $CaO—La_2O_3/CeO_2$ catalyst was found to depend primarily on the amount of CaO present as shown in Table 4. The catalyst with the highest $CaO:La_2O_3$ ratio (Run 20) gave the highest yield (97% at 3.5 hours) and highest dissolved metal concentrations (140 ppm). The dissolved calcium species in the FAME reaction products was found to be proportional to the amount of calcium present in the catalyst system. Although calcium leaching from basic supports is inevitable, the extent of this leaching can be minimized by using the combined metal oxide catalysts and support materials of the present disclosure.

The supported catalyst system of the present disclosure is believed to function due to the strong basic sites that exist on the surface of this supported catalyst. The base strength and base amount exhibited by this catalyst system when prepared according to the teachings of the present disclosure are substantially higher than expected. The activity associated with the supported catalyst system of the present disclosure for oil transesterification reactions rivals the activity associated with a NaOH catalyst and is substantially higher than the activity exhibited by a $H_2SO_4$ catalyst or other reported conventional heterogeneous-based catalysts. The amount of calcium in the mixed metal oxide catalyst may range from about 0.5 to 15 atomic % with about 0 to 15 atomic % of another metal, such as lanthanum or cerium, being present in the additional metal oxide comprised within the mixed metal oxide catalyst.

According to another aspect of the present disclosure, the supported catalyst systems may optionally include a number of metal oxides in excess of two (i.e., combinations of Ce, La, Ca, Nd, Pr, Er, Gd, and Yb in addition to $CaO—CeO_2$ or $CaO—La_2O_3$). For example, $CaO—NdOx\text{-}La_2O_3$, $CaO—NdOx\text{-}La_2O_3—CeO_2$, $CaO—YbOx\text{-}La_2O_3—CeO_2$, $CaO—ErOx\text{-}La_2O_3—NdOx$, $CaO—CeO_2—La_2O_3—PrOx$, $CaO—GdOx\text{-}La_2O_3$, to name a few (Ox=oxide), may be used in combination with a support material. Various combinations of these metal oxides can be supported on $La_2O_3$ via a sol-gel hydrothermal process. For example, a $CaO—PrOx\text{-}La_2O_3—CeO_2/La_2O_3$ catalyst system can be prepared by dissolving calcium nitrate, praseodymium nitrate, lanthanum nitrate, and cerium nitrate salts in water. The metal salt mixture is then added to lanthanum oxide powder and mixed together with the mixture being allowed to initially age for 4 hours at room temperature, followed by further aging and drying at 120° C. for 12 hours. The resulting gel can then be pelletized (e.g., shaped into a pelletized form), followed by being calcined at 1300° C. for 30 minutes. At this point, the resulting pellets are strong enough to be used in a continuous flow reactor.

TABLE 4

| Run # | Catalyst | Atomic % in catalysts | | Yield (%) at 3.5 hr | Concentration in the product (oil phase) |
|---|---|---|---|---|---|
| | | Ca (%) | La (%) | | $[Ca^{2+}]$ ppm |
| 20 | $8CaO—La_2O_3/CeO_2$ | 12.7 | 4.7 | 97 | 140 |
| 21 | $6CaO—La_2O_3/CeO_2$ | 8.6 | 5.0 | 96 | 137 |

TABLE 4-continued

| Run # | Catalyst | Atomic % in catalysts | | Yield (%) | Concentration in the product (oil phase) |
|---|---|---|---|---|---|
| | | Ca (%) | La (%) | at 3.5 hr | [Ca$^{2+}$] ppm |
| 22 | 2CaO—La$_2$O$_3$/CeO$_2$ | 8.4 | 7.5 | 87 | 92 |
| 23 | 2CaO—3La$_2$O$_3$/CeO$_2$ | 5.2 | 11.0 | 80 | 32 |
| 24 | CaO—2La$_2$O$_3$/CeO$_2$ | 4.0 | 11.2 | 66 | 20 |

Reaction condition: soybean oil 10.0 g, methanol: oil mole ratio = 10:1, catalyst 0.8 g, reaction temperature 64° C., shaking speed 450 rpm.

These combination metal oxide supported catalysts exhibit high catalytic activity for transesterification reaction and minimal calcium dissolution. These combination catalyst systems exhibit a high activity for the transesterification reaction due to a synergistic effect resulting from the combination of the metal oxides. In fact, a very high conversion of oil to FAME reaction products, i.e., almost 100% yield, was observed upon using these combination supported catalysts for more than 40 days in a continuous flow reactor with a reaction temperature of 90° C., a retention time of 76 minutes, and methanol to oil (tryglycerides) ratio of 15:1.

Figure 4:
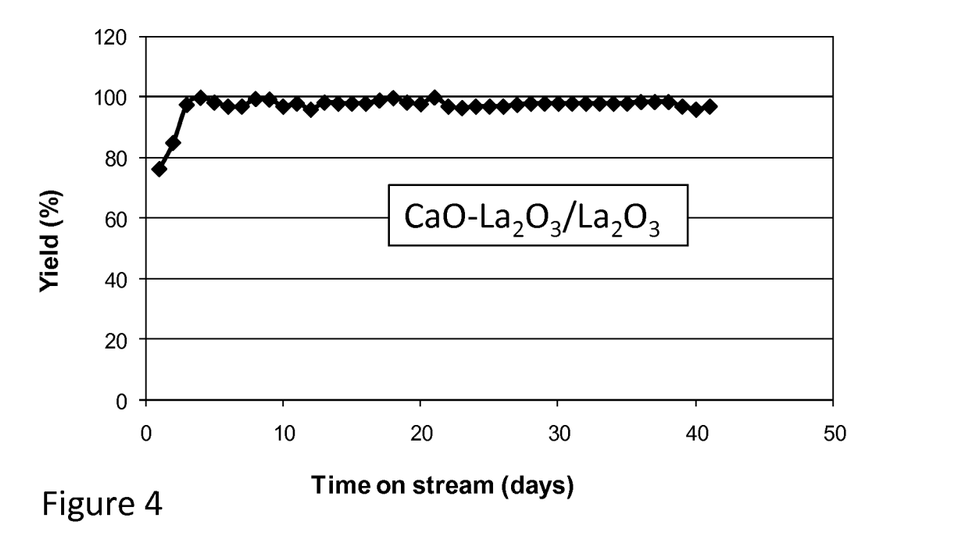
FIG. 4 is a graphical representation of the longer term yield of fatty acid methyl ester (FAME) obtained using a $CaO$—$La_2O_3$/$La_2O_3$ supported catalyst system (under reaction conditions of temperature 90° C., Soybean Oil (SBO):Methanol ratio=1:15, and retention time=76 minutes)
Figure 5:
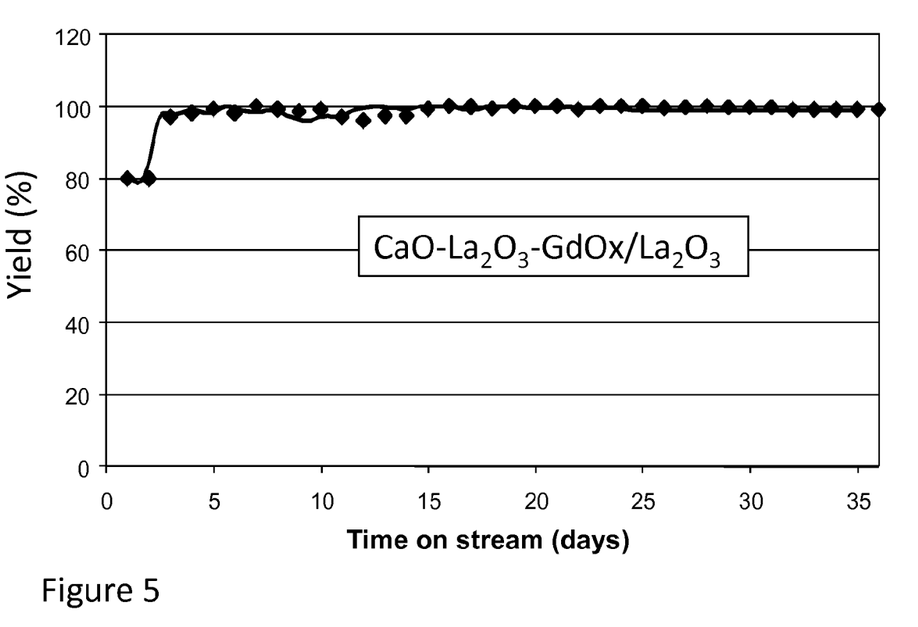
FIG. 5 is a graphical representation of the longer term yield of fatty acid methyl ester (FAME) obtained using a $CaO$—$La_2O_3$—$GdOx$/$La_2O_3$ combination catalyst system under the same reaction conditions as FIG. 4.

The results obtained using the combination supported catalyst systems for transesterification reactions in a continuous flow reactor are summarized in both Table 5 and FIGS. 4 and 5. The combination catalyst, CaO—La$_2$O$_3$—GdOx/La$_2$O$_3$, was observed to exhibit a higher yield of FAME reaction products than the heterogeneous catalyst CaO—La$_2$O$_3$/La$_2$O$_3$ as demonstrated by comparing the yield of FAME obtained as a function of time under similar reaction conditions (e.g., compare FIGS. 4 and 5). It is believed that this increased activity is caused by the synergistic effect of the combined metal-oxides. As shown in Table 5, calcium dissolutions were similar from both the supported catalyst system and the combination supported catalyst system. However, the combination catalyst of CaO—La$_2$O$_3$—GdOx/La$_2$O$_3$ showed slightly better stability as demonstrated by the slightly smaller amount of calcium dissolution (Table 5, Runs 25-29) than the supported catalyst of CaO—La$_2$O$_3$/La$_2$O$_3$.

TABLE 5

| Run # | Time on stream | Calcium concentration (ppm) in FAME phase | |
|---|---|---|---|
| | | CaO—La$_2$O$_3$/La$_2$O$_3$ | CaO—La$_2$O$_3$—GdOx/La$_2$O$_3$ |
| 25 | 1$^{st}$ Day | 180 | 37 |
| 26 | 2$^{nd}$ Day | 20 | 18 |
| 27 | 10$^{th}$ Day | 13 | 10 |
| 28 | 20$^{th}$ Day | 3.2 | 2.9 |
| 29 | 30$^{th}$ Day | 3.0 | 2.4 |

According to another embodiment of the present disclosure, the supported catalyst systems of the present disclosure are prepared from the use of alcohol, water, and carbon dioxide to precipitate calcium and lanthanum from raw solutions. The precipitate so obtained is then changed via calcination into a metal oxide mixture that exhibits strong basic properties and high activity for oil transesterification reactions. For example, the heterogenous catalyst may be formed according to the following procedure; First, alcohol (30-95%) is added to a mixture of 2 moles La(NO$_3$)$_3$ and 1 mole Ca(Acetate)$_2$. The pH of the resulting solution is then adjusted to about 9 through the use of a 6 molar solution of ammonia in water. The mixture is heated to boiling and the temperature maintained between about 78 to 100° C. A 10 volume percent of CO$_2$ gas is then allowed to flow through the solution for 30 minutes. The precipitate that forms from this solution is filtered and washed with a small amount of distilled water. The precipitate is then dried at about 150° C. for 12 hour period, followed by calcination at about 430° C. for 1 hour and then 750° C. for about 8 hours to form the catalyst. If this catalyst is stored in air, one skilled in the art will understand that it may be necessary to activate the catalyst by exposing it to a pure N$_2$ flow prior to usage.

Figure 6:
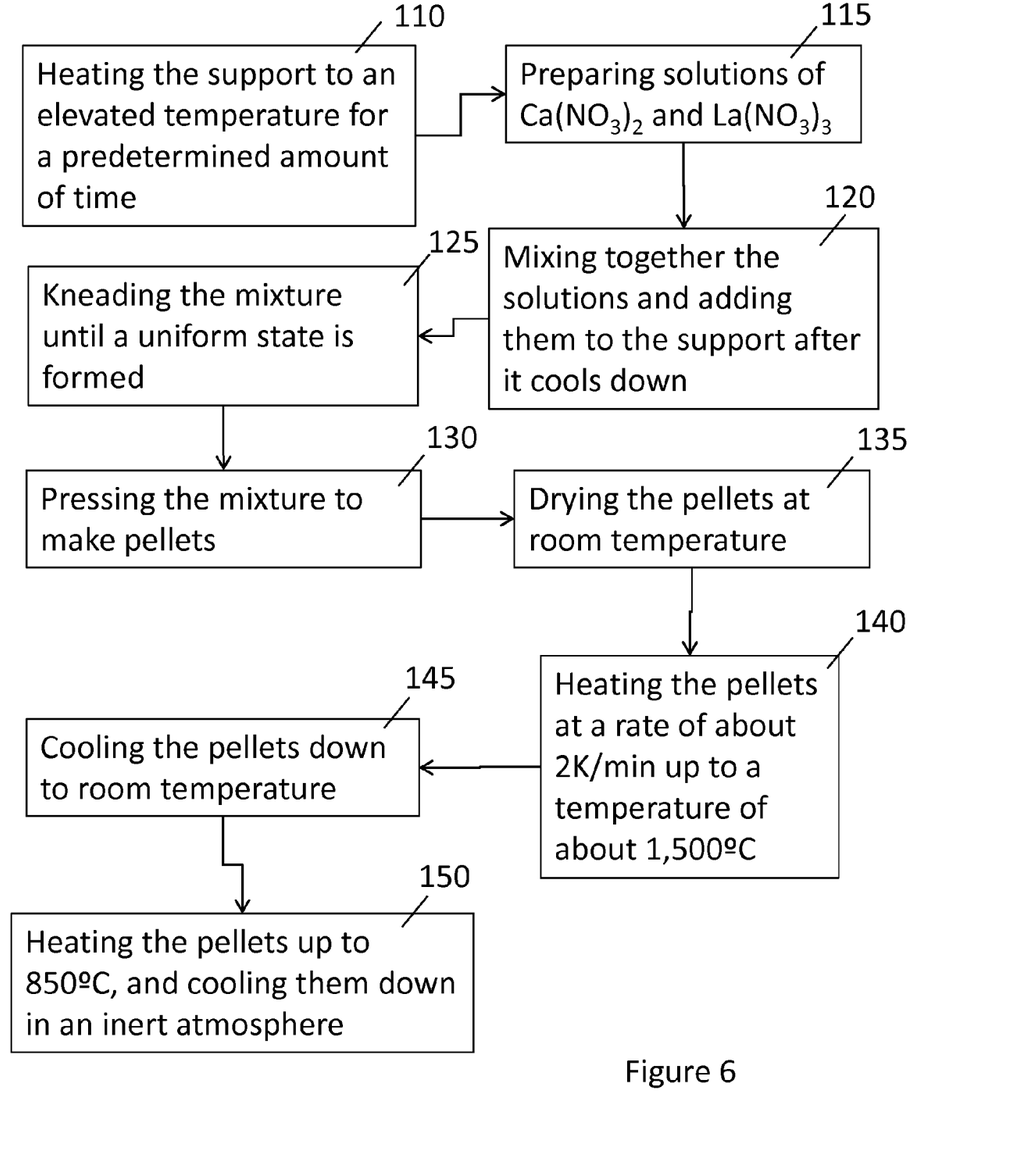
FIG. 6 is a schematic representation of a method of preparing and pelletizing the supported catalyst system of the present disclosure.

The synthesis method may also optionally include the pelletizing of the solid catalyst. In this case, the cerium, calcium or lanthanum salts, for example, Ce(NO$_3$)$_4$, Ca(NO$_3$)$_2$, La(NO$_3$)$_3$, can be used both as a pelletizing agent and as the catalyst itself. For example, a pelletized catalyst of CaO—La$_2$O$_3$/La$_2$O$_3$ may be formed according to the procedure described in FIG. 6. First, heating 110 the support to an elevated temperature for a predetermined time. For example, 400 grams of La$_2$O$_3$ may be heated to 550° C. for 30 minutes. Then solutions of Ca(NO$_3$)$_2$ and La(NO$_3$)$_3$ are prepared 115. For example, a solution of Ca(NO$_3$)$_2$ may for formed by mixing 47.2 grams of Ca(NO$_3$)$_2$ with 75 grams of water. Similarly, a solution of La(NO$_3$)$_3$ may be formed by mixing 86.8 grams of La(NO$_3$)$_3$ with 75 grams of water. The solutions may then be mixed 120 together and added to the La$_2$O$_3$ after it is allowed to cool down. The mixture is then kneaded 125 until a uniform state is formed. The uniform mixture is then pressed 130 (e.g., using an extruder) into pellets, dried 135 at room temperature, and then heated 140 at a rate of about 2K/minute up to a temperature of about 1,500° C. The pellets are then cooled 145 down to room temperature for storage. Prior to being used as a supported catalyst, the pellets should be heated 150 up to about 850° C. and cooled down in the presence of an inert atmosphere, such as N$_2$.

The supported catalysts prepared according to the teachings of the present disclosure offer two advantages over conventional heterogeneous catalysts, namely, a high catalytic surface area and the ability to stabilize calcium species on the basic supports. Preferably cerium oxide or lanthanum oxide are used as the support material. The catalytic activity of calcium can be accelerated or maintained at a relatively constant level due to the basic nature of the support. In addition, the active species, CaO, can be stabilized on the supports by using a combination of metal oxides.

It is another objective of the present invention to provide a method of forming a biodiesel product from transesterification of oils. The method comprises the steps of preparing a heterogeneous catalyst system that comprises a mixture of calcium oxide and other metal oxides deposited on a basic support; placing an oil feedstock and an alcohol in contact with the catalyst system to form a reaction mixture, heating the reaction mixture to a predetermined reaction temperature; allowing the transesterification of triglycerides in the oil feedstock to occur for a predetermined amount of time to form fatty acid methyl esters resulting in a biodiesel product; and finally separating the catalyst from the biodiesel product in order to collect the biodiesel product.

The oil feedstock that is placed in contact with the catalyst system to form a reaction mixture is preferably soybean oil (SBO) having only a low concentration of free fatty acids and water. However, one skilled-in-the-art will understand that other oils may be utilized without departing from the scope of the disclosure. According to another aspect of the present disclosure, the soybean oil may optionally include free fatty acids in a concentration that is greater than about 0.5 wt. %, and water in a concentration that is greater than about 0.06 wt. %. The alcohol is preferably methyl alcohol. The oil feedstock may be selected as one from the group of cooking oil, soybean oil, palm oil, food-grade soybean oil, and combinations or mixtures thereof to name a few.

The following specific examples are given to illustrate the invention and should not be construed to limit the scope of the invention.

Example 1

Catalyst Preparation and Characterization

Supported $CaO-CeO_2$ and $CaO-La_2O_3$ catalysts are prepared by an impregnation method. Appropriate mixtures of two metal salt solutions: $Ca(NO_3)_2.4H_2O(1.0\ M)$ with $Ce(NO_3)_4.6H_2O$ $Ca(NO_3)_2.4H_2O(1.0\ M)$ or $La(NO_3)_3.6H_2O$, are loaded on the γ-alumina, zirconium oxide, cerium oxide, lanthanum oxide, ZSM-5, and titanium oxide (anatase) by the impregnation method. The calcium nitrate, lanthanum nitrate, and cerium nitrate were purchased from Sigma-Aldrich (Milwaukee, Wis.). γ-Alumina, zirconium oxide, cerium oxide, lanthanum oxide, and titanium oxide (anatase) were purchased from Inframat® Advanced Materials™ LLC (Farmington, Conn.). ZSM-5 was hydrothermally synthesized.

For a typical catalyst preparation, a mixed solution of 9.4 mL of $Ca(NO_3)_2.4H_2O(1.0\ M)$ and 2.4 mL of $Ce(NO_3)_3.6H_2O$ (1.0 M) is added to 9.0 g $La_2O_3$ powder. The mixture is kneaded thoroughly and aged for 12 hours and dried at room temperature for 12 hours. The dried solids are then heated at a rate of 10° C./min to 500° C. and kept for 0.5 hours in air, and are then further calcined at 750° C. for 30 minutes. The resulting supported catalyst systems are added to a mixture of anhydrous methanol and soybean oil to minimize possible contamination from ambient moisture and carbon dioxide. The anhydrous methyl alcohol (99.8%) was obtained from Fisher Scientific (Fair Lawn, N.J.) and ethyl alcohol (200 Proof) was from Decon Labs, Inc (King of Prussia, Pa.). Commercial edible grade soybean oil (total acid number of 0.05 mg KOH/g) was obtained from a warehouse (COSTCO, MI).

The metal compositions of the catalysts were measured with a Hitachi S-2400 (Scotia, N.Y.) scanning electron microscopy (SEM) equipped with an energy dispersive spectrometer (EDS). The basic strength of the $CaO-La_2O_3$ loaded catalysts were measured by titration method. More specifically, 100 mg of the catalysts are heated to 750° C. and added to anhydrous 2.0 mL methanol. After 2 hours, two drops of various indicators solutions (0.04M) are added to observe the pH values of the solution derived from solid catalysts. The indicator solutions, which included 2,4-dinitroaniline, alizarine yellow R, thymolphthalein, phenolphthalein, cresol red, neutral red, bromothylmol blue, methyl red, and bromophenol blue, were purchased from Sigma-Aldrich (Milwaukee, Wis.).

This example describes and characterizes the materials used to form the catalysts and the methodology used to characterize the structure and activity of the catalysts that are used throughout this disclosure and in the following example.

Example 2

Transesterification Procedure and Analysis Methods

Erlenmeyer flasks (25 mL) containing soybean oil, methanol, and catalyst were used as batch reactors. Typically, 10.0 g of soybean oil and 4.55 mL of methanol are put into a flask; thereafter 0.8 g of catalyst is added to the flask. The molar ratio of methanol:soybean oil was 10:1, and the catalyst loading was maintained at 8.0%. The catalysts were added into the methanol/soybean oil mixture. Flasks containing the reactants and catalyst are first placed at 64° C. for 20 minutes at 0 rpm in a shaking bath (Series 25 incubator, New Brunswick Scientific Co.), and then mixed at a speed of 450 rpm. The reactions were regarded to start when the shaking or mixing started.

The supported $CaO-CeO_2/La_2O_3$ catalyst is tested in a continuous flow reactor. Granular type of catalyst is packed in a stainless steel tube (12.7 mm outside diameter and 60 cm length). The feed ratio of methanol to oil of 15:1 and a feed rate of 0.5 mL/min are utilized. Two feed lines (0.323 mL/min for soy bean oil and 0.177 mL/min for methanol) are merged in to one feed line and supplied to the top of the reactor. The pressure of reactor is maintained by a back pressure regulator. The retention time of feed is 73 minutes. The reaction proceeded at 80° C. and 14 atm. The product is collected for every 12 hours for eight days for further analysis.

The biodiesel yield (%) is defined as total weight percent of fatty acid methyl esters from the weight of product after removing methanol and free glycerol. The concentrations of fatty acid methyl esters in the samples were quantified by using GC-MS with a capillary column (Rtx-WAX catalog number 12426). Ethyl arachidate and methyl arachidate (Nu-Chek Prep Inc., Elysian, Minn.) were used as internal standards. The concentration of metals dissolved from the catalyst was measured with inductively coupled plasma spectrometry (Optima TM 2100 DV ICP-OES system, Perkin-Elmer).

This example demonstrates the basic methodology used to conduct the transesterification reactions described throughout this disclosure.

A person skilled in the art will recognize that all of the measurements described are standard measurements that can be obtained by a variety of different test methods. The test methods described in the examples and the throughout the specification represent only one available method capable of obtaining each of the desired measurements.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A supported, heterogeneous catalyst system used for the production of a biodiesel product from the transesterification of an oil, the supported catalyst system comprising:
   a mixed metal oxide catalyst; the catalyst including calcium oxide and at least one additional metal oxide; and
   a metal oxide support selected from the group consisting of $CeO_2$ and $La_2O_3$ upon which the catalyst is deposited;
   wherein the metal oxide support exhibits basic properties and provides a synergistic effect to the mixed metal oxide catalyst in catalyzing transesterification reactions; and
   wherein the supported catalyst system exhibits a pH of at least about 10.0 when 0.1 grams of the supported catalyst system is added to 2 mL of methanol.

2. The supported catalyst system of claim 1, wherein the additional metal oxide in the mixed metal oxide catalyst is at least one selected from the oxides in which the metal is Ce, La, Nd, Pr, Er, Gd, or Yb.

3. The supported catalyst system of claim 2, wherein the mixed metal oxide catalyst is one selected from the group of $CaO-CeO_2$ and $CaO-La_2O_3$.

4. The supported metal catalyst system of claim 2 wherein the supported catalyst system is in a pelletized form.

5. The supported metal catalyst system of claim 2, wherein the mixed metal oxide catalyst is one selected from the group of $CaO-NdOx-La_2O_3$, $CaO-NdOx-La_2O_3-CeO_2$, $CaO-YbOx-La_2O_3-CeO_2$, $CaO-ErOx-La_2O_3-NdOx$, $CaO-CeO_2-La_2O_3-PrOx$, $CaO-NdOx-CeO_2$, and $CaO-GdOx-La_2O_3$.

6. The supported metal catalyst system of claim 1, wherein the amount of calcium in the supported catalyst system ranges from about 0.5 to 15 atomic % and the amount of the other metals that comprise the additional metal oxide in the supported catalyst system range from about 0 to 15 atomic %.

7. The supported metal catalyst system of claim 1, wherein the metal oxide support exhibits a pH of at least about 8.0 when 0.1 grams of the support is added to 2 mL of methanol.

8. A biodiesel product formed by reacting an oil with an alcohol in the presence of the supported catalyst system of claim 1.

9. The supported catalyst system of claim 1, wherein the supported catalyst system exhibits a pH of at least about 12.0 when 0.1 grams of the supported catalyst system is added to 2 mL of methanol.

* * * * *